(12) United States Patent
Yu et al.

(10) Patent No.: US 10,838,451 B2
(45) Date of Patent: Nov. 17, 2020

(54) DETACHABLE DISPLAY DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Long Yu, Wuhan (CN); Yu-Cheng Chen, New Taipei (TW); Guang-Cheng Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 24 days.

(21) Appl. No.: 16/247,760

(22) Filed: Jan. 15, 2019

(65) Prior Publication Data

US 2020/0167024 A1 May 28, 2020

(30) Foreign Application Priority Data

Nov. 28, 2018 (CN) .......................... 2018 1 1437380

(51) Int. Cl.
| | | |
|---|---|---|
| G06F 1/16 | (2006.01) | |
| H05K 5/00 | (2006.01) | |
| G02F 1/1333 | (2006.01) | |

(52) U.S. Cl.
CPC ...... *G06F 1/1601* (2013.01); *G02F 1/133308* (2013.01); *H05K 5/0017* (2013.01); *G02F 2001/133331* (2013.01); *G06F 1/1637* (2013.01)

(58) Field of Classification Search
CPC ... G02F 1/133308; G02F 2001/133331; G06F 1/1637; G06F 3/0412; G06F 1/1601; H05K 5/0017
See application file for complete search history.

(56) References Cited

U.S. PATENT DOCUMENTS

| | | | | |
|---|---|---|---|---|
| 4,515,440 | A  * | 5/1985 | Mosier ............. | G02F 1/133308 349/110 |
| 8,111,347 | B2 * | 2/2012 | Koganezawa ....... | G02F 1/1333 349/153 |
| 8,284,548 | B2 * | 10/2012 | Takechi ........... | G02F 1/133308 248/323 |
| 2017/0075160 | A1 * | 3/2017 | Yang ................ | G02F 1/133385 |
| 2019/0263322 | A1 * | 8/2019 | Hayashi ............. | G02F 1/1333 |

* cited by examiner

*Primary Examiner* — James Wu
(74) *Attorney, Agent, or Firm* — ScienBiziP, P.C.

(57) ABSTRACT

A display device includes an outer frame, an inner frame, and a glass. The inner frame is movably coupled to the outer frame, and the inner frame and the outer frame cooperatively define a glass receiving slot. One end of the glass is received in the glass receiving slot and clamped between the inner frame and the outer frame.

9 Claims, 4 Drawing Sheets

DETACHABLE DISPLAY DEVICE

FIELD

The subject matter herein generally relates to display devices.

BACKGROUND

More and more display devices have a touch function. The display device with touch function includes a touch module, a display module, and front and rear housings for fixing the touch module and the display module, respectively. Therefore, when the touch module and the display module need to be repaired or replaced, the front and rear housings need to be removed before the touch module and the display module can be removed. In addition, the display module and the touch module are respectively attached to opposite sides of a glass, and the glass is bonded together by a high-strength glue. Therefore, disassembly and replacement of the touch module, the display module, and the glass are complicated.

BRIEF DESCRIPTION OF THE DRAWINGS

Implementations of the present disclosure will now be described, by way of embodiments, with reference to the attached figures.

DETAILED DESCRIPTION

Figure 1:
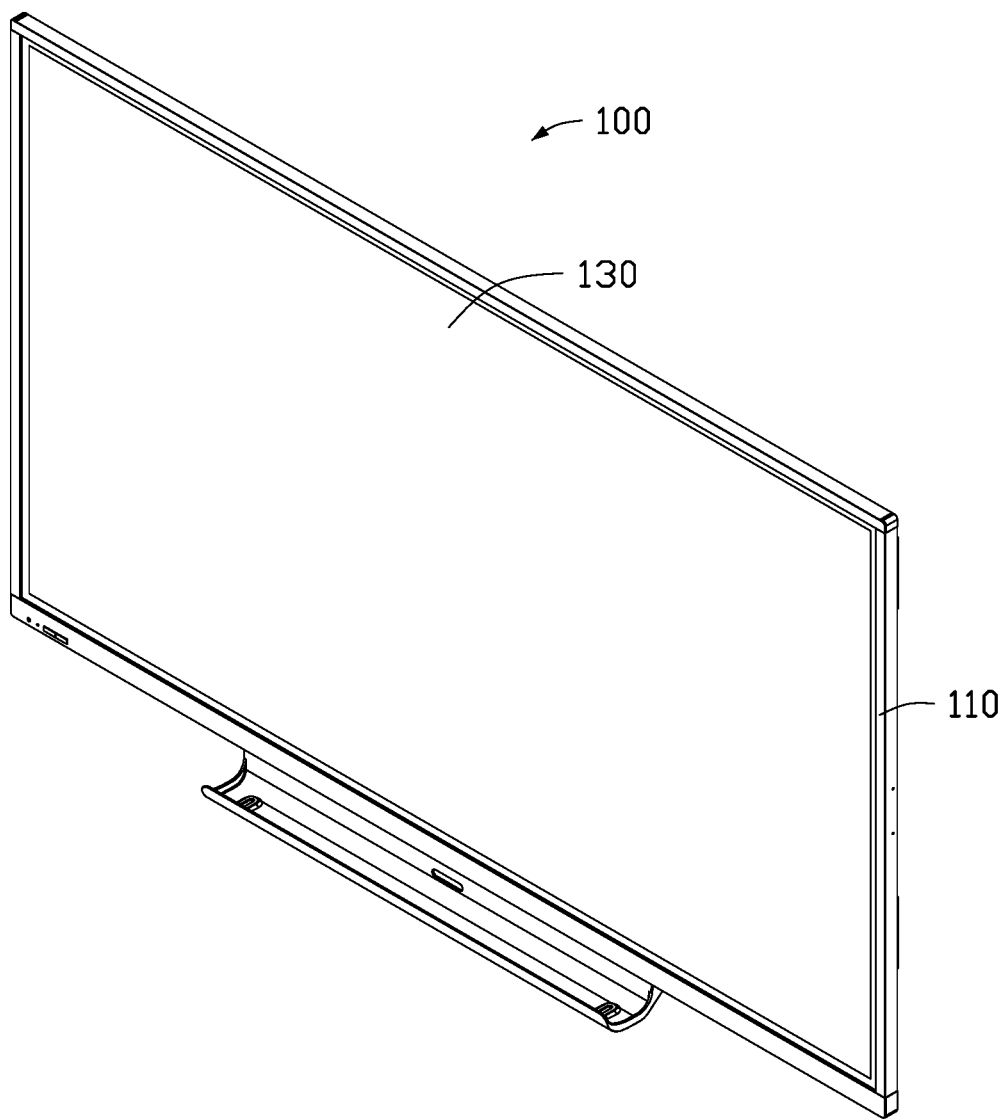
FIG. 1 is an isometric view of an embodiment of a display device.
Figure 2:
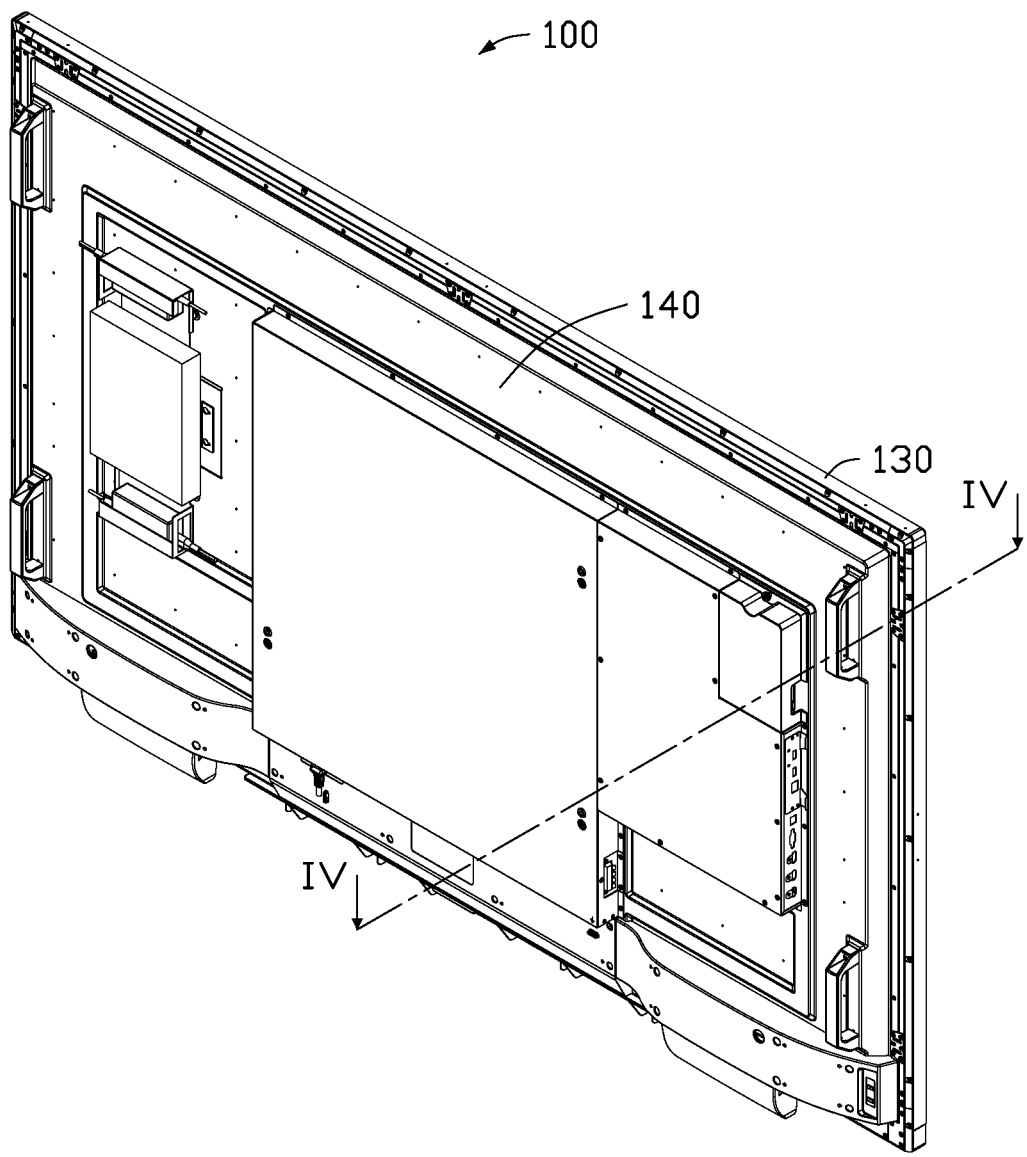
FIG. 2 is similar to FIG. 1, but showing the display device from another angle.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 3:
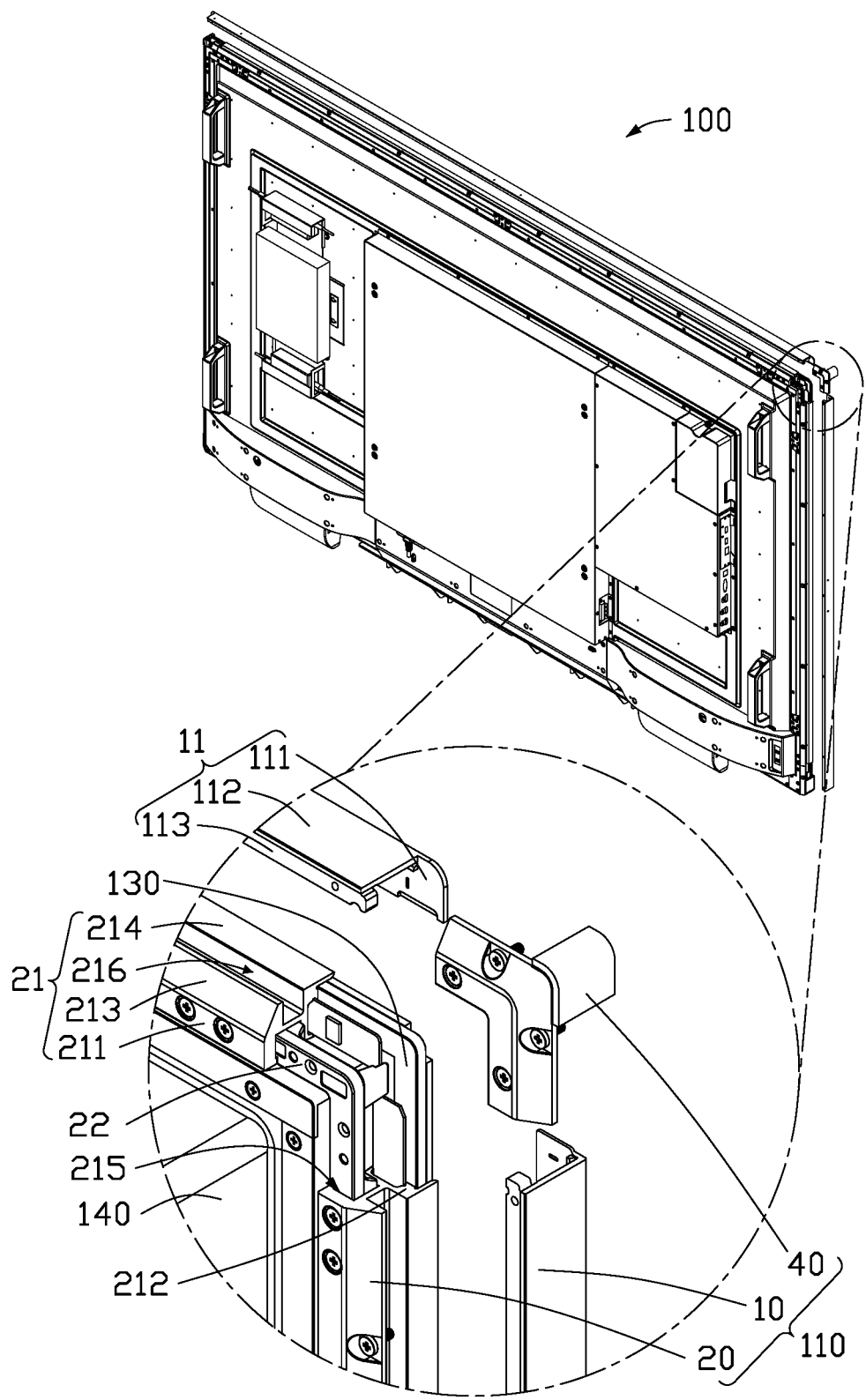
FIG. 3 is a partial exploded view of a corner of the display device shown in FIG. 2.
Figure 4:
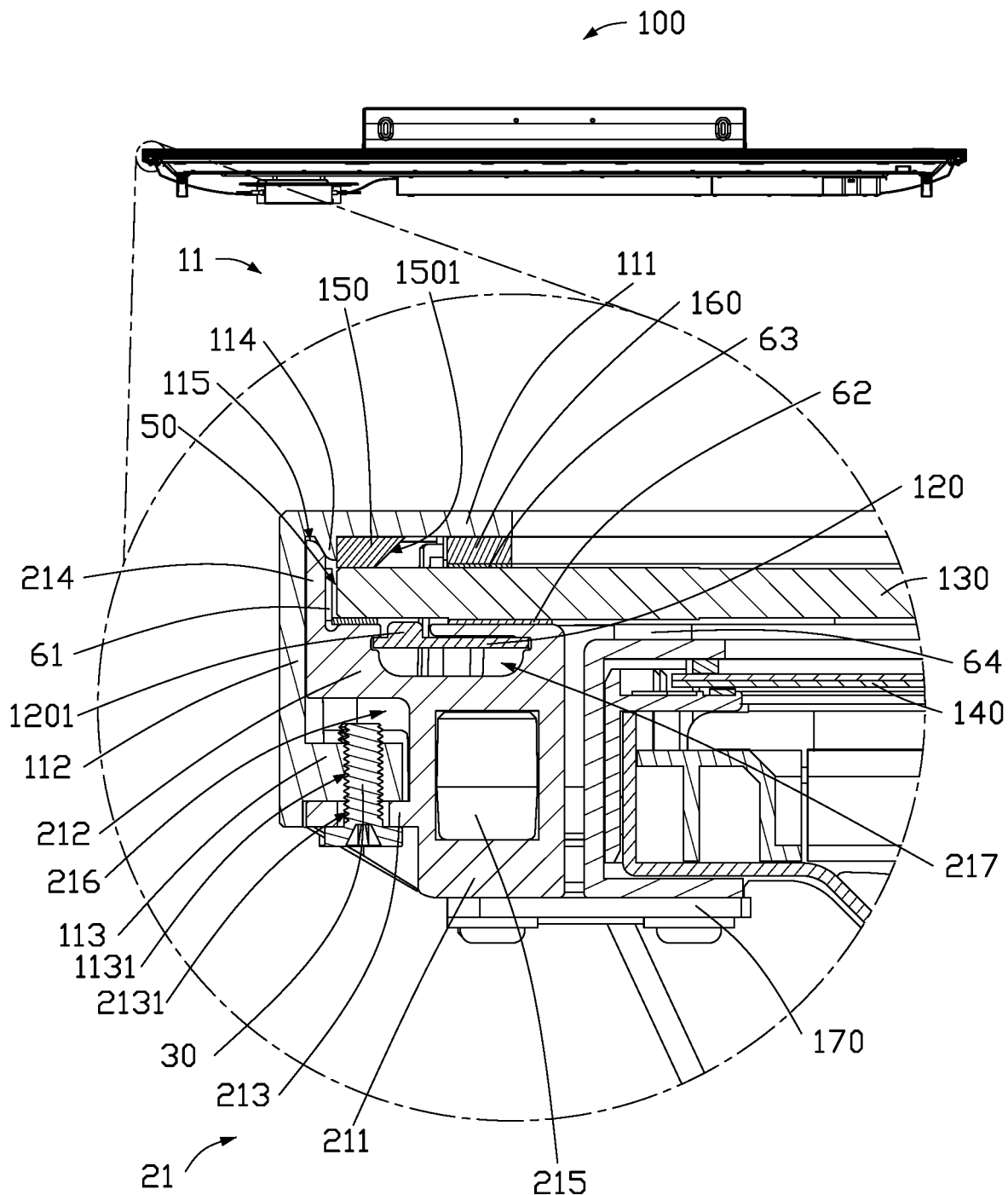
FIG. 4 is a cross-sectional view taken along line IV-IV of FIG. 2.

Referring to FIG. 1, FIG. 3, and FIG. 4, a display device 100 includes a frame 110, a plurality of touch modules 120, a glass 130, a display module 140, a plurality of optical refractive strips 150, and a plurality of filter strips 160. The touch panel 120 is received and fixed in the frame 110, and the glass 130 is clamped in the frame 110 and faces the touch modules 120 and the display module 140. The display module 140 is fixed to the frame 110. The optical refractive strips 150 are fixed inside the frame 110 and face the glass 130. The optical refractive strips 150 face the touch module 120. The filter strips 160 are fixed within the frame 110 and face the optical refractive strips 150 and the glass 130.

Referring to FIG. 3, the frame 110 includes an outer frame 10 and an inner frame 20 movably coupled to the outer frame 10. In one embodiment, the inner frame 20 and the outer frame 10 are coupled together by a screw 30.

The outer frame 10 includes at least two outer strips 11.

In one embodiment, the outer frame 10 includes four outer strips 11. Each of the outer strips 11 is substantially F-shaped. Each of the outer strips 11 includes a first side 111, a second side 112 perpendicularly coupled to the first side 111, and a first screw portion 113 formed on the second side 112 and substantially parallel to the first side 111. A first screw hole 1131 is defined in the first screw portion 113 and extends through the first screw portion 113.

Each of the outer strips 11 further includes an anti-lock block 114 fixed to the first side 111. The anti-lock block 114 is substantially perpendicular to the first side 111. In one embodiment, an end of the anti-lock block 114 facing the second side 112 is an inclined surface, and an angle between the inclined surface and the first side 111 is an obtuse angle.

An anti-lock slot 115 is cooperatively defined by the anti-lock block 114, the first side 111, and the second side 112.

In one embodiment, the first side 111, the second side 112, the first screw portion 113, and the anti-lock block 114 are integrally formed. In other embodiments, the first side 111, the second side 112, the first screw portion 113, and the anti-lock block 114 may be glued together or indirectly fixed together.

The inner frame 20 includes at least two inner strips 21.

In one embodiment, the inner frame 20 includes four inner strips 21 and four corner fixing members 22. Each two adjacent two inner strips 21 are coupled end to end by one of the corner fixing members 22.

Each of the inner strips 21 includes a fastening portion 211, a receiving portion 212, a second screw portion 213, and an anti-lock arm 214. The receiving portion 212 is formed on the fastening portion 211, and the second screw portion 213 is formed on the fastening portion 211 and substantially parallel to the receiving portion 212. The anti-lock arm 214 is formed on the receiving portion 212.

In one embodiment, a surface of the first screw portion 113 of the outer frame 10 away from the first side 111 may be formed with a latching block (not shown), and the second screw portion 213 of the inner frame 20 may be formed with a latching slot (not shown) that matches the latching block. The latching block may be T-shaped, and the latching slot may also be T-shaped, so that the latching block may enter or exit the latching slot from the side to fix the inner frame 20 to the outer frame 10.

A fastening receiving slot 215 is defined in the fastening portion 211. The fastening receiving slot 215 receives an end of the corner fixing member 22.

A portion of the receiving portion 212 protruding from the fastening portion 211 and the second screw portion 213 cooperatively define a first screw portion receiving slot 216, and the first screw portion receiving slot 216 receives the first screw portion 113.

A touch module receiving slot 217 is defined in the receiving portion 212. The touch module receiving slot 217 receives the touch module 120 to mount the touch module 120.

A second screw hole 2131 is defined in the second screw portion 213. The second screw hole 2131 is opposite to the first screw hole 1131. A screw 30 sequentially passes through the second screw hole 2131 and the first screw hole 1131 to mount the outer strip 11 and the inner strip 21 together. The first screw portion 113 of the outer strip 11 is received in the first screw portion receiving slot 216, and the anti-lock arm 214 is received in the anti-lock slot 115.

The receiving portion 212, the anti-lock arm 214, and the first side 111 cooperatively define a glass receiving slot 50. The touch module receiving slot 217 is connected to the glass receiving slot 50.

The corner fixing member 22 is substantially L-shaped, and two ends of the corner fixing member 22 are respectively received in the fastening receiving slots 215 of the adjacent two inner strips 21, thereby coupling the four inner strips 21 end to end to form a hollow inner frame structure.

In other embodiments, the corner fixing members 22 are omitted, such that the four inner strips 21 are coupled directly end to end.

The frame 110 further includes an outer corner cover 40 having an angled shape to be fixed on a corner of the frame 110. Two ends of the outer corner cover 40 are respectively coupled to two adjacent outer strips 11 to shield the touch module 120, the corner fixing member 22, and the glass 130 exposed from between the adjacent two outer strips 11.

A buffer 61 is attached to a surface of the anti-lock arm 214 facing the glass receiving groove 50. When an end of the glass 130 is clamped in the glass receiving groove 50, the buffer 61 facing the end of the glass 130 buffers an impact force on the glass 130. In one embodiment, the buffer 61 is a soft film.

A first foam 62 is attached to a surface of the receiving portion 212 facing the first side 111 to protect the glass 130.

The touch module 120 is received in the touch module receiving slot 217. The touch module 120 includes a signal light 1201, and the signal light 1201 faces the glass receiving groove 50. The signal light 1201 transmits an optical signal. In one embodiment, the optical signal transmitted by the signal light 1201 is an infrared signal.

At least two opposite ends of the glass 130 are received in the glass receiving groove 50. One end of the glass 130 faces the buffer 61. The signal light 1201 faces the glass 130.

The display module 140 is fixed to the fastening portion 211 of the inner frame 20 by a plurality of fixing clamps 170 facing the glass 130. A third foam 64 is formed between the display module 140 and the glass 130.

The optical refractive strip 150 is fixed on the first side 111 of the outer strip 11 and is attached to the glass 130. The optical refractive strip 150 includes a refractive surface 1501, and the signal light 1201 faces the refractive surface 1501. In one embodiment, an angle between the refractive surface 1501 and the first side 111 is an obtuse angle. The optical refractive strip 150 is adjacent to the anti-lock block 114.

The filter strip 160 is fixed on the first side 111 of the outer strip 11 and faces the refractive surface 1501. The optical refractive strip 150 is located between the anti-lock block 114 and the filter strip 160. A second foam 63 is attached between the filter strip 160 and the glass 130, and the second foam 63 is used to buffer an impact force between the filter strip 160 and the glass 130. The filter strip 160 filters stray light in an optical signal emitted by the signal light 1201.

The optical signal emitted by the signal light 1201 passes through the glass 130 to the refractive surface 1501 of the optical refractive strip 150. After refracting off the refractive surface 1501, a direction of the optical signal is bent 90 degrees, thereby effecting exchange of optical signals.

The fixing clamp 170 is fixed to one end of the display module 140 and the fastening portion 211 of the inner strip 21 by screws.

In assembly of the display device 100, the buffer 61 and the first foam 62 are respectively attached to the anti-lock arm 214 and the receiving portion 212 of the inner strip 21. Then, the touch module 120 is inserted into the touch module receiving groove 217. Then, the four inner strips 21 are connected end to end by the four corner fixing members 22 to form the inner frame 20. Then, the inner frame 20 is placed on the glass 130. The anti-lock arm 214 of the inner frame 20 encloses an outer periphery of the glass 130. Then, the optical refractive strip 150 and the filter strip 160 are attached to an inner wall of the first side 111 of the outer frame 10, and the second foam 63 is attached to a surface of the filter strip 160 facing the glass 130. The optical refractive strip 150 is located between the anti-lock block 114 and the filter strip 160. The optical refractive strip 150 is adjacent to the anti-lock block 114, and the refractive surface 1501 faces the signal light 1201 of the touch module 120. Then, the outer strip 11 is mounted to the inner frame 20 and fixed by screws. The anti-lock arm 214 is inserted into the anti-lock slot 115. Next, a third foam 64 is attached to a surface of the glass 130 away from the first side 111, and the display module 140 is mounted on the glass 130. The display module 140 is fixed to the fastening portion 211 of the inner strip 21 by the fixing clamp 170. Finally, the four outer corner covers 40 are mounted to the four corners of the inner frame 20, thereby completing assembly of the display device 100.

If the glass 130, the touch module 120, or other components need to be repaired or replaced, the display device 100 is disassembled in a reverse order of assembly.

The display device 100 as described above has the following features. First, one end of the glass 130 is clamped between the inner frame 20 and the outer frame 10, and the inner frame 20 is movably coupled to the outer frame 10. Thus, if the glass 130 or the touch module 120 needs to be replaced or repaired, the inner frame 20 and the outer frame 10 can be directly disassembled, so that the glass 130 or the touch module 120 can be quickly disassembled and replaced. Second, the anti-lock slot 115 is located on the outer frame 10, and the anti-lock arm 214 matching the anti-lock slot 115 is located at an end of the inner frame 20 facing the glass 130. The anti-lock arm 214 encompasses the end of the glass 130 and is inserted into the anti-lock slot 115 to prevent the outer frame 10 from being stretched. Third, the touch module 120 inserted into the inner frame 20 can reduce a volume of the display device 100. Fourth, the optical refractive strip 150 is arranged on the first side 111 facing the signal light 1201 to change and optimize a transmission path of the optical signal.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A detachable display device comprising:
an outer frame;
an inner frame detachably coupled to the outer frame and cooperatively defining a glass receiving slot with the outer frame; and
at least two opposite ends of a glass received in the glass receiving slot and clamped between the inner frame and the outer frame;
wherein the outer frame comprises at least two outer strips;
each outer strip comprises a first side, a second side perpendicular to the first side, and an anti-lock block mounted on the first side;
the anti-lock block and the second side form an anti-lock slot;
the inner frame comprises at least two inner strips;
each inner strip comprises an anti-lock arm;
the anti-lock arm encloses the glass and is inserted into the anti-lock slot.

2. The detachable display device of claim 1, wherein:
each outer strip comprises a first screw portion perpendicularly coupled to the second side;
each inner strip comprises a first screw portion receiving slot;
the first screw portion is received within the first screw portion receiving slot.

3. The detachable display device of claim 2, wherein:
each inner strip comprises a second screw portion;
the second screw portion is movably coupled to the first screw portion by a screw.

4. The detachable display device of claim 1, wherein:
the anti-lock block is perpendicular to the first side;
an end of the anti-lock block facing the second side is an inclined surface; and
an angle between the inclined surface and the first side is an obtuse angle.

5. The detachable display device of claim 1 further comprising a touch module, wherein:
each inner strip comprises a touch module receiving slot;
the touch module receiving slot is connected to the glass receiving slot;
the touch module is received within the touch module receiving slot.

6. The detachable display device of claim 5 further comprising an optical refractive strip fixed to the first side and facing the glass, wherein:
the touch module comprises a signal light;
the optical refractive strip comprises a refractive surface inclined relative to the first side and facing away from the second side;
the signal light faces the refractive surface.

7. The detachable display device of claim 6 further comprising a filter strip fixed to the first side, wherein the optical refractive strip is located between the anti-lock block and the filter strip.

8. The detachable display device of claim 1, wherein:
each inner strip comprises a fastening receiving slot;
the inner frame comprises a plurality of corner fixing members;
two ends of each corner fixing member are respectively inserted into the fastening receiving slots of the adjacent two inner strips.

9. The detachable display device of claim 1 further comprising a display module formed on the glass and fixed to the inner frame by a plurality of fixing clamps.

* * * * *